US009369335B2

(12) United States Patent
Zhao et al.

(10) Patent No.: US 9,369,335 B2
(45) Date of Patent: Jun. 14, 2016

(54) MRSVP-TE BASED FAST REROUTE IN DETOUR (1:1) PROTECTION MODE

(71) Applicant: Futurewei Technologies, Inc., Plano, TX (US)

(72) Inventors: Katherine Zhao, San Jose, CA (US); Ying Chen, Santa Clara, CA (US); Qianglin Quintin Zhao, Boxborough, MA (US); Tao Zhou, Beijing (CN); Renwei Li, Fremont, CA (US); Lin Han, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/977,759

(22) Filed: Dec. 22, 2015

(65) Prior Publication Data

US 2016/0112247 A1   Apr. 21, 2016

Related U.S. Application Data

(63) Continuation of application No. 13/918,358, filed on Jun. 14, 2013, now Pat. No. 9,219,614.

(60) Provisional application No. 61/659,884, filed on Jun. 14, 2012.

(51) Int. Cl.
*H04L 12/18* (2006.01)
*H04L 12/24* (2006.01)
*H04L 12/707* (2013.01)

(52) U.S. Cl.
CPC ............ *H04L 41/0654* (2013.01); *H04L 45/22* (2013.01)

(58) Field of Classification Search
CPC .............................. H04W 4/06; H04W 72/005
See application file for complete search history.

(56) References Cited

U.S. PATENT DOCUMENTS

| 7,602,702 | B1 * | 10/2009 | Aggarwal | ........... | H04L 370/217 |
| | | | | | 370/217 |
| 8,050,279 | B2 * | 11/2011 | Li | ........................ | H04L 12/2859 |
| | | | | | 370/395.5 |
| 8,477,600 | B2 | 7/2013 | Yong et al. | | |

(Continued)

OTHER PUBLICATIONS

Aggarwal, Ed., R., et al., Extensions to Resource Reservation Protocol—Traffic Engineering (RSVP-TE) for Point-to-Muitipoint TE Label Switched Paths (LSPs), RFC 4875, May 2007, 50 pages.

(Continued)

*Primary Examiner* — Jay P Patel
(74) *Attorney, Agent, or Firm* — Conley Rose, P.C.; Grant Rodolph; William H. Dietrich

(57) ABSTRACT

An apparatus comprising a memory, and a processor coupled to the memory and configured to transmit a multicast Resource Reservation Protocol-Traffic Engineering (mRSVP-TE) path request (PATH) message upstream, wherein the PATH message requests reservation of a backup Label Switched Path (LSP) to protect an active LSP configured to transmit multicast data. The disclosure also includes a computer program product comprising computer executable instructions stored on a non-transitory computer readable medium such that when executed by a processor cause a network element (NE) to receive a multicast PATH message from a downstream node, wherein the NE acts as a Point of Local Repair (PLR) along an active LSP, wherein the active LSP is configured to transmit multicast data, and wherein the PATH message requests reservation of a backup LSP to protect the active LSP.

20 Claims, 5 Drawing Sheets

(56) References Cited

U.S. PATENT DOCUMENTS

| | | | |
|---|---|---|---|
| 8,804,719 B2* | 8/2014 | Aldrin | H04L 12/1881 370/390 |
| 2006/0159009 A1* | 7/2006 | Kim | H04L 12/18 370/216 |
| 2006/0256712 A1 | 11/2006 | Imajuku et al. | |
| 2008/0123524 A1 | 5/2008 | Vasseur et al. | |
| 2009/0185478 A1 | 7/2009 | Zhang | |
| 2010/0177631 A1 | 7/2010 | Chen et al. | |
| 2011/0022881 A1 | 1/2011 | Nakata | |
| 2011/0211445 A1 | 9/2011 | Chen | |
| 2011/0280123 A1 | 11/2011 | Wijnands et al. | |
| 2013/0016605 A1 | 1/2013 | Chen | |
| 2013/0089100 A1 | 4/2013 | Zhao et al. | |
| 2013/0208580 A1 | 8/2013 | Berg et al. | |
| 2014/0003803 A1 | 1/2014 | Sfeir et al. | |

OTHER PUBLICATIONS

Andersson, L., et al., "The Multiprotocol Label Switching (MPLS) Working Group decision on MPLS signaling protocols," RFC 3468, Feb. 2003, 11 pages.

Awduche, D., et al., "RSVP-TE: Extensions to RSVP for LSP Tunnels," RFC 3209, Dec. 2001, 61 pages.

Berger, Ed., L., et al., "Generalized Multi-Protocol Label Switching (GMPLS) Signaling Resource Reservation Protocol-Traffic Engineering (RSVP-TE) Extensions," RFC 3473, Jan. 2003, 42 pages.

Berger, L., et al., "GMPLS Segment Recovery," RFC 4873, May 2007, 26 pages.

Le Faucheur, F., et al., "Requirements for Support of Differentiated Services-aware MPLS Traffic Engineering," RFC 3564, Jul. 2003, 22 pages.

Braden, Ed., R., et al., "Resource Reservation Protocol (RSVP)—Version 1 Functional Specification," RFC 2205, Sep. 1997, 112 pages.

Bradner, S., "Key Words for use in RFCs to Indicate Requirement Levels," RFC 2119, Mar. 1997, 3 pages.

Pan, Ed, P., et al., "Fast Reroute Extensions to RSVP-TE for LSP Tunnels," RFC 4090, May 2005, 38 pages.

Rosen, E., et al., "Multiprotocol Label Switching Architecture," RFC 3031, Jan. 2001, 61 pages.

Li, R., et al., "Receiver-Driven Multicast Traffic Engineered Label Switched Paths," draft-lzj-mpls-receiver-driven/multicast-rsvp-te-00.txt, Internet-Draft, Mar. 4, 2012, 25 pages.

Li, R., et al., "Receiver-Driven Multicast Traffic-Engineered Label-Switched Paths," draft-lzj-mpls-receiver-driven-nulticast-rsvp-te-02.txt, Internet-Draft, Oct. 23, 2012, 33 pages.

Zhao, K., et al., "Fast Reroute Extensions to Receivers-Driven RSVP-TE for Multicast Tunnels," draft-zlj-mpls-mrsvp-te-frr-01.txt, Internet-Draft, Jan. 9, 2013, 25 pages.

Zhao, K., et al., "Fast Reroute Extensions to Receiver-Driven RSVP-TE for Multicast Tunnels," draft-zlj-mpls-mrsvp-te-frr-00.txt, Jul. 6, 2012, 24 pages.

Zhao, Q., et al., "Protection Mechanisms for Label Distribution Protocol P2MP/MP2MP Label Switched Paths," draft-zhao-mpls-mldp-protections-02.txt, Mar. 13, 2012, 26 pages.

Pan, P., Ed., et al., "Fast Reroute Techniques in RSVP-TE," draft-pan-rsvp-fastreroute-00.txt, Mar. 4, 2012, 31 pages.

Foreign Communication From a Counterpart Application, PCT Application No. PCT/US2013/045948, International Search Report dated Sep. 2, 2013, 4 pages.

Foreign Communication From a Counterpart Application, PCT Application No. PCT/US2013/045948, Written Opinion lated Sep. 2, 2013, 9 pages.

Foreign Communication From a Counterpart Application, PCT Application No. PCT/US2013/045950, International Search Report dated Oct. 28, 2013, 4 pages.

Foreign Communication From a Counterpart Application, PCT Application No. PCT/US2013/045950, Written Opinion dated Oct. 28, 2013, 9 pages.

Office Action dated Jan. 27, 2015, 19 pages, U.S. Appl. No. 13/918,358, filed Jun. 14, 2013.

Difice Action dated Feb. 25, 2015, 21 pages, U.S. Appl. No. 13/918,373, filed Jun. 14, 2013.

* cited by examiner

MRSVP-TE BASED FAST REROUTE IN DETOUR (1:1) PROTECTION MODE

CROSS-REFERENCE TO RELATED APPLICATIONS

The present application is a continuation of U.S. patent application Ser. No. 13/918,358, filed Jun. 14, 2013 by Katherine Zhao, et. al., and entitled "mRSVP-TE Based Fast Reroute in Detour (1:1) Protection Mode," which claims priority to U.S. Provisional Patent Application 61/659,884, filed Jun. 14, 2012 by Katherine Zhao, et. al., and entitled "mRSVP-TE Based Fast Reroute in Detour (1:1) Protection Mode," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data Centers (DCs) may comprise servers configured to transmit data to downstream hosts, such as end user devices, private network servers, etc. For example, server(s) may substantially simultaneously stream video and/or other live data to a plurality of hosts. The servers may be traditional servers and/or virtual machines (VMs) operating on computer hardware, for example in cloud based DCs. Substantially simultaneously streaming substantially identical data content to a plurality of hosts or other network nodes may be referred to as multicasting. Such data may be encoded in discrete packets and forwarded toward user terminals through the DCs core network. Multicast data packets may be routed through the core network using various techniques in the Operational Systems Interconnect (OSI) model data link layer and/or network layer, which may also be referred to as layer 2 and layer 3, respectively.

SUMMARY

In one embodiment, the disclosure includes an apparatus comprising a memory, and a processor coupled to the memory and configured to transmit a multicast Resource Reservation Protocol-Traffic Engineering (mRSVP-TE) path request (PATH) message upstream, wherein the PATH message requests reservation of a backup Label Switched Path (LSP) to protect an active LSP configured to transmit multicast data.

In another embodiment, the disclosure includes a computer program product comprising computer executable instructions stored on a non-transitory computer readable medium such that when executed by a processor cause a network element (NE) to receive a multicast PATH message from a downstream node, wherein the NE acts as a Point of Local Repair (PLR) along an active LSP, wherein the active LSP is configured to transmit multicast data, and wherein the PATH message requests reservation of a backup LSP to protect the active LSP.

In another embodiment, the disclosure includes a method comprising sending a first PATH message toward a multicast sender over a primary path, checking whether a detour route is available for primary path protection, if at least one detour route is found, select a shortest detour route and initiate a detour LSP setup, wherein detour LSP setup comprises considering a PLR as an end point of a detour LSP, sending a second PATH message toward the PLR along the shortest detour route, and receiving a mRSVP-TE reserve (RESV) message from the PLR.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
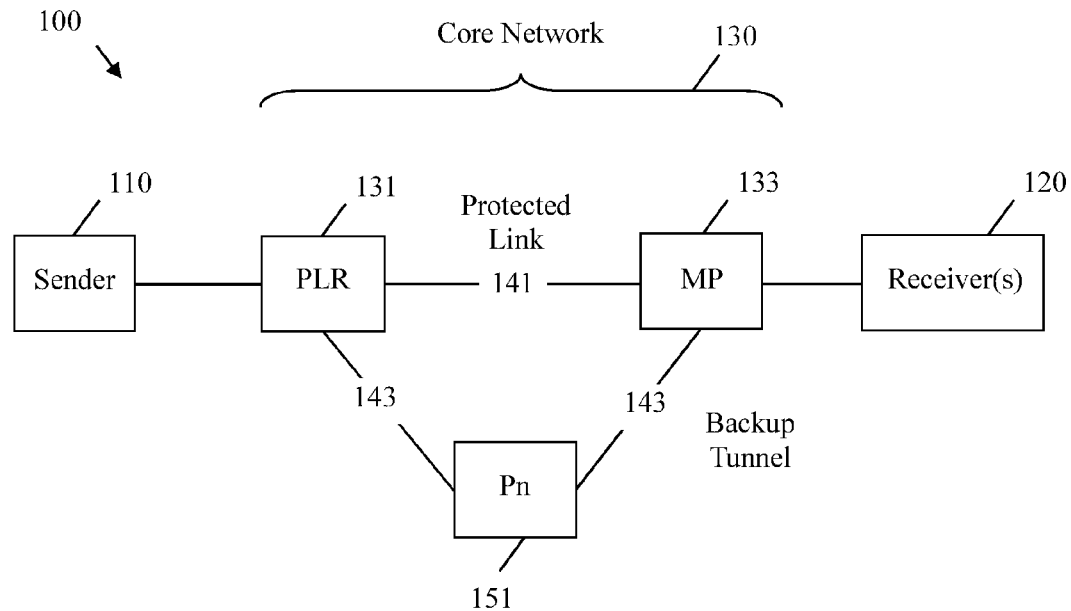
FIG. 1 is a schematic diagram of an embodiment of a multicast enabled network architecture for LSP link protection.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Networks, such as DC core networks, may route packets using Multiprotocol Label Switching (MPLS), which may be a scalable, protocol agnostic, data carrying mechanism. In MPLS, labels may be assigned to each packet. As a packet is transmitted through the network, intermediate network nodes (e.g. routers) may make packet routing and/or switching decisions based on the contents of the label without the need to review the contents of the underlying packet. A path across an MPLS network that may be traversed by a packet via label switching may be referred to as a LSP. MPLS may be discussed further in Internet Engineering Task Force (IETF) document Request For Comments (RFC) 3031, which is incorporated by reference.

MPLS may be employed to transmit substantially the same data to a plurality of receivers using multicasting techniques. An MPLS network may create label based multicast trees using Resource Reservation Protocol-Traffic Engineering (RSVP-TE), which may be discussed in IETF documents RFC 3209 and RFC 4875, which are incorporated by reference. Such multicast trees may allow data packets to be sent downstream toward the receivers. Network nodes positioned as branches of the tree may replicate packets, which may result in distributing processing associated with packet replication across the tree instead of requiring the source to perform packet replication. Such distribution methods may increase the scalability of the system, as a single node may be unable to perform sufficient packet replication to support a large number of users.

MPLS networks transmitting data using RSVP-TE may allow for high quality and high speed transmission of data. However, hardware and/or software failure in the network may result in poor performance while such problems are detected and addressed. As such, MPLS systems may employ a fast reroute protocol as discussed in IETF document RFC 4090, which is incorporated by reference. The fast reroute protocol, which is also known as MPLS local restoration and/or MPLS local protection, may be employed to reserve backup LSPs to protect active LSPs. When a link and/or a node along an active protected LSP fails, traffic from the failed section of the LSP may be quickly rerouted to the backup LSP until the failure(s) are remedied and/or until the LSPs can be permanently rerouted and/or reoptimized. The fast reroute protocol may allow traffic to be rerouted on the order of tens of milliseconds, which may prevent entities external to the DC from experiencing any significant change in data flow.

IETF document draft-lzj-mpls-receiver-driven-multicast-rsvp-te-02, which is incorporated by reference, discusses mRSVP-TE, which may be an alternate embodiment for multicasting data across MPLS systems. In mRSVP-TE, resource reservation for multicast may be controlled by a downstream receiver node instead of by an upstream transmitter node, as may be the case in multicasting under RFC 4875. As such, the fast reroute protocol, which may also be controlled by an upstream transmitter node, may not be interoperable with mRSPV-TE.

Disclosed herein is method, apparatus, and/or system to support fast rerouting for multicast traffic in an MPLS network employing mRSVP-TE in detour mode. In detour mode, each LSP may be protected by a distinct backup, which may result in one to one (1:1) protection. Downstream nodes, such as border routers and/or other nodes located at the edge of the core network, may receive a request for multicast data from node(s) positioned outside of the core network, such as hosts and/or nodes positioned in an access network. For example, such multicast requests may be protocol independent multicast (PIM) join messages, Internet Group Management Protocol (IGMP) membership reports, Multicast Listener Discovery (MLD) membership reports, etc. In response to such request(s), the downstream node may transmit a PATH message upstream to reserve resources for an active LSP for multicast data transmission in accordance with draft-lzj-mpls-receiver-driven-multicast-rsvp-te-02. The downstream node may then determine if a potential detour LSP (e.g. a backup LSP) exists that may protect the active LSP. Upon determining that a potential detour LSP exists, the downstream node may assign a downstream label for the detour path and transmit a PATH message along the detour path toward an upstream node acting as a PLR. The PATH message may comprise the downstream label. Each intermediate node(s) along the detour path may record the downstream label in a local Forwarding Information Base (FIB), assign a new local downstream label, and replace the PATH message downstream label with the locally assigned downstream label. Such a process may be referred to as downstream label assignment. The PLR node, which may be positioned along the active LSP, may receive the PATH message, record the downstream label from the PATH message in a local FIB, and respond by transmitting a RESV message downstream along the alternate LSP to confirm the alternate LSP as a backup LSP for the active LSP. The PLR may or may not assign upstream label(s) for opposite direction communication and include such label(s) in the RESV message. Once the backup LSP is reserved, if either a link or a node positioned downstream of the PLR node and along the active LSP fails, the PLR may obtain the downstream label for the backup LSP from the local FIB and reroute data by attaching the downstream label to the data packets. The backup LSP may be temporary and may be employed until the network can perform a reconvergence procedure to reoptimize the data flow along a more optimal active LSP. The devices and methods disclosed herein may be further discussed in IETF document draft-zlj-mpls-mrsvp-te-frr-01, which is incorporated herein by reference.

The present disclosure may employ the following terms, which may be defined as follows: (1) Multicast LSP (mLSP) may be a Point-to-Multipoint (P2MP) or Multipoint-to-Multipoint (MP2MP) or other MP2MP path LSP comprising one or more sub-LSPs or other sub-paths; (2) mRSVP-TE may be receiver-driven multicast RSVP-TE wherein LSP tunnel setup is initiated by a data receiver instead of a data sender; (3) PLR may be a Label Switch Router (LSR) or other node configured to detect local failure event(s) and redirect traffic from a protected mLSP to a backup mLSP tunnel designed to take over traffic forwarding until the protected tunnel is repaired; (4) Merge Point (MP) may be an LSR or other node configured to initiate the setup of a backup LSP in which the PLR is the root of the backup LSP and configured to merge traffic from a backup LSP with a primary LSP at the level of forwarding plane; (5) Node (N) may be a node that will be protected by a backup LSP or other backup path; (6) a backup Path node (Pn) may be any node on the backup LSP or other backup path protecting a node N or a link of the protected LSP or other protected path; (7) a Root may be a router or other node that acts as a root for an mLSP such that multicast contents may enter the root and be distributed to leaf routers along a P2MP and/or MP2MP LSP or other path; (8) Fast ReRoute (FRR) Domain may be a set of links and LSRs that compose a protected sub-LSP (or other sub-path) and backup LSP (or other backup path), and which may be located between a PLR and MP(s); (9) upstream may mean a device, data, and/or thing is oriented and/or positioned toward a data stream source from a network location; and (10) downstream may mean a device, data, and/or thing is oriented and/or positioned toward a data stream receiver from a network location.

As discussed herein, Fast Reroute technology may provide millisecond-level protection in case of node and/or link failures. FRR may employ some local repair mechanisms to meet fast reroute requirements by computing and provisioning backup tunnels in advance of failure and by redirecting traffic to such backup tunnels as close to a failure point as possible. The fast reroute extensions to RSVP-TE may be specified in IETF documents RFC 4090 and RFC 4875. Such extensions may operate with sender-driven RSVP-TE, but may not be applicable to the receiver-driven RSVP-TE for multicast tunnels as described in IETF document draft-lzj-mpls-receiver-driven-multicast-rsvp-te-02.

In a receiver-driven paradigm such as mRSVP-TE, the procedure to set up an LSP tunnel may be inverted from that in sender-driven RSVP-TE. As such, backup mLSP setup and failover handling mechanism may be different from what has been specified for sender-driven RSVP-TE. From the signaling point of view, the behavior of PLR and MP may be inverted from the sender-driven paradigm of RSVP-TE. The setup for a backup mLSP may be initiated by MP with PLR being taken as the root of a P2MP/MP2MP tree. The RSVP PATH message may be sent from MP towards PLR with FAST REROUT, DETOUR, as well as other FRR related objects conveyed in a PATH message. RSVP RESV message may be sent from PLR towards MP carrying FRR information such as the inner label used to represent a protected mLSP tunnel, etc.

On the other hand, from the packet forwarding point of view, the behavior of PLR and MP may be similar to the sender-driven RSVP-TE. The traffic switchover and redirecting may be initiated by PLR, and the data traffic may be merged at MP in a similar manner as specified for the sender-driven RSVP-TE.

FRR link protection may aim to protect a direct link between two LSRs. An LSR at one end of the protected link may be called a PLR, and the LSR located at the other end of the protected link may be called an MP. A backup LSP whose setup is originated at MP and terminated at PLR may be established to protect the primary LSP crossing over the protected link. The LSRs over the backup path may be called Pn. The connected LSRs and links used for FRR and LSP protection may be called an FRR domain (e.g. PLR 131, MP 133, Pn 151, LSP 141, and LSP 143 in network 100, PLR 231, MP 233, Pns 251-252, N 235, and LSPs 241 and 243 in network 200, and PLR 331, MPs 333 and 337, Pns 351-354, N 335, and LSPs 341-343 and 345 in network 300, respectively).

In an FRR domain constructed by mRSVP-TE, the MP may initiate both the primary and the backup LSP setup at the signaling control plane, and may merge traffic from the backup LSP into the primary LSP at the data forwarding plane. The PLR may work with the MP to set up the LSP at the signaling control plane accordingly, may detect link failure, and may initiate local repair at the data forwarding plane.

On the control plane, the backup LSP may be set up along with its primary LSP setup. The PATH/RESV refresh messages may be transmitted over both protected and backup LSPs before failover. On the data plane, there may be two implementation options for traffic forwarding. One option is that traffic may not be forwarded on backup LSP tunnel until a failure is detected and the local repair takes place. The second option is to forward traffic on both protected and backup mLSPs before failover. The LSR at the Merge Point may then drop packets coming from the backup path before switchover. The second option may further reduce traffic switchover time at the cost of extra overhead and bandwidth sub-optimization.

Two independent methods for doing fast reroute may have been developed. One backup method is called detour backup and is especially designed for 1:1 protection. The other fast reroute method may be called facility backup and is especially designed for 1:N protection, where N can be equal to or greater than 1. From the point of view of applications, the facility backup method can support both 1:N and 1:1. From a technical point of view, these are two different methods which may require different implementations with respect to label stacks when forwarding packets.

In detour mode, the detour backup may create a dedicated backup LSP to protect an active LSP and may employ a single MPLS label for packet encapsulation. Such implementation may be simpler but may consume more label resources. The facility backup may create a common LSP to protect a set of LSPs that have similar backup constraints. This method takes advantage of MPLS label stacking and may dual-label encapsulation, which may save some label resources compared to the detour backup method. The embodiments discussed herein may be primarily applicable to detour mode. However, such embodiments may be employed in facility mode as well.

FIG. 1 is a schematic diagram of an embodiment of a multicast enabled network 100 architecture for LSP link protection. Network 100 may comprise at least one multicast sender 110 and a plurality of multicast receivers 120 associated as part of a multicast tree. A multicast tree with a plurality of senders 110 may referred to as a MP2MP multicast tree and a multicast tree with a single sender may be referred to as a P2MP multicast tree. Sender 110 may transmit multicast data to receivers 120 across a core network 130 comprising a plurality of interconnected nodes and links. Specifically, core network 130 may comprise a node configured to act as an MP 133, a node configured to act as a PLR 131, and a node configured to act as a Pn 151. The nodes may be connected by protected LSP link 141 and backup LSP 143.

Sender 110 may be a machine capable of transmitting multicast data to a plurality of receivers 120. For example, sender 110 may comprise a server, a cluster of servers, a cloud based VM, or other entity capable of retrieving and transmitting multicast data. Sender 110 may be positioned inside a DC. Multicast data multicast by the sender 110 may be any data that may be replicated and substantially simultaneously transmitted (e.g. streamed) to a plurality of receivers 120. For example, multicast data may comprise live streaming audio and/or video such as Internet Protocol (IP) television (TV), internet radio, and other streaming media. Sender 110 may transmit multicast data to receivers 120 via a logical multicast tree. For example, sender 110 may transmit multicast data downstream across the multicast tree and interested receivers 120 may join the tree and receive the data. Sender 110 may be the sole source of multicast data in a P2MP multicast tree structure and/or one of a plurality of sources of multicast data in a MP2MP multicast tree. Sender may or may not be configured to receive data and/or requests from downstream nodes. For example, a P2MP sender 110 may not receive data from downstream nodes, while a MP2MP sender 110 may receive data from downstream nodes.

Core network 130 may be a network of interconnected nodes (e.g. NEs) configured to transmit data between a sender 110 and a receiver 120. For example, core network 130 may be located in a DC and transmit data from the edge of the DC to servers located inside the DC. The core network 130 may comprise aggregation nodes configured to aggregate traffic from a plurality of servers, a switching fabric to control the transmission of data streams (e.g. flows), and border routers positioned at the edge of the data center domain and configured to control data access to and from the DC domain. The core network 130 may be configured to support MPLS. Specifically, core network 130 nodes may be configured to calculate LSPs, create Forwarding Equivalency Classes (FECs) for the LSPs, and assign labels for each FEC. The network nodes may share labels and/or other MPLS and/or routing information using MPLS protocols and store such labels and/or information in a FIB. When a data packet is received at the upstream edge of an MPLS domain, a core network 130 node may attach a label to the packet based on FEC according to a local FIB and forward the packet downstream. Subsequent network nodes may act as LSRs and may switch each packet according to label(s) based on FIB entries, which may cause each packet to flow downstream along an associated LSP. For example, an LSR may receive a packet with an upstream label, look up the upstream label in the FIB, find a downstream label that is bound to the upstream label and/or FEC in the FIB, replace the upstream label with the downstream label, and forward the packet to the next node in the LSP. LSRs may only review the labels and not the underlying packet, which may result in increased switching efficiency. As the underlying packet may not be reviewed by the LSRs, an LSP may be considered a tunnel. Upon reaching the edge of an MPLS domain, for example at a core network 130 border router, the edge node may remove the label(s) and forward the packet toward the receiver 120, for example across an access network, using IP routing, Media Access Control (MAC) routing, or other OSI layer 2 and/or layer 3 protocols.

Receivers 120 may be any devices configured to receive multicast data. Receivers 120 may comprise residential gateways (RGs), customer premises equipment (CPEs), IP set top boxes, servers, smart phones, personal computers (PCs), tablet PCs, IP TVs, and/or other devices configured to receive streaming video, audio, or other multicast data. Receivers 120 may also be referred to as hosts and may be positioned at the edge of access network(s), inside residential networks, and/or inside other private networks. A receiver 120 wishing to receive multicast data may transmit an Internet Group Management Protocol (IGMP) membership report, a multicast listener discovery (MLD) membership report, a Protocol Independent Multicast (PIM) join request, or other request to join a multicast tree toward the sender 110. In addition or in the alternative, such join requests may be sent on behalf of the receiver 120 by other node(s). A join request may be forwarded upstream until such request is received by a node that is a member of the requested multicast tree. The receiver 120 and/or nodes between the receiver and the first member node may then become members of the multicast tree. A node of a multicast tree with a single downstream receiver 120 may be referred to as a leaf and a node with a plurality of downstream receivers 120 on a plurality of interfaces may be referred to as a branch. Branches may replicate packets received on upstream interfaces for transmission on the plurality of downstream interfaces.

Core network 130 may comprise network nodes PLR 131, MP 133, and Pn 151. For example, PLR 131, MP 133, and Pn 151 may be core network 130 switching fabric nodes. In addition and/or in the alternative, MP 133 may comprise a core network 130 edge and/or MPLS domain edge border router. PLR 131, an MP 133, and a Pn 151 may be connected as shown in FIG. 1. MP 133 may receive join request message(s) from receivers 120 on downstream interface(s) and join the multicast tree on behalf of the receivers using MPLS signaling. MP 133 may send PATH requests toward sender 110 via PLR 131 to create active LSP 141. Active LSP 141 may then transmit multicast data from the edge of the MPLS domain to MP 133 via PLR 131 for further transmission toward the interested receivers 120. PATH requests for an active LSP such as LSP 141 may be sent via the shortest and/or most optimal path through the MPLS domain that can be determined by MP 133. PLR 131 may respond with a RESV request indicating active LSP 141 has been setup. MP 133 may also calculate alternate path(s) to protect active LSP 141 in case of failure. For example, MP 133 may wish to protect a link between MP 133 and PLR 131 against failure. MP 133 may calculate, and request via PATH message, backup LSP 143 (e.g. backup tunnel) across a detour path passing through Pn 151. Backup LSP 143 may protect the link between MP 133 and PLR 131 against failure, but may be a less optimal path than LSP 141. MP 133 may be positioned on both the active LSP 141 and the backup LSP 143 and may be a merge point for both LSPs. In the event of a failure along LSP 141 between PLR 131 and MP 133, PLR 131 may employ a FRR protocol to mitigate multicast data interruption. For example, PLR 131 may detect a downstream link failure along LSP 141 and obtain a downstream label for LSP 143, which may be bound to the information for LSP 141 in the PLR's 131 FIB. The PLR 131 may attach the label for LSP 143 to multicast packets and switch such packets to LSP 143. Such actions by PLR 131 may result in a local repair of LSP 141. The rerouted multicast packets may traverse LSP 143 and be received by MP 133. MP 133 may determine the label received with the multicast packets is associated with the backup LSP 143, may obtain forwarding information from MP's 133 local FIB, and may forward multicast packets downstream in a manner consistent with the forwarding of multicast packets prior to the failure. As a result, nodes downstream of MP 133 may be substantially unaware of the link failure and service interruptions of the multicast tree may be minimized.

Backup LSP 143 may not be the same path as protected LSP 141 to ensure protection against failure. As such, backup LSP 143 may be sub-optimal. Backup LSP 143 may be temporarily employed by the network to substantially prevent service interruption while the failed link is repaired. In addition or in the alternative, core network 130 may employ a network reconvergence algorithm in the MPLS control plane to recalculate and/or reoptimize LSPs for use in the MPLS forwarding plane based on the existence of the link failure. Backup LSP 143 may be torn down once network reconvergence is complete.

As discussed herein, the term detour LSP may denote an LSP in the detour mode and the 1:1 protection scheme. A detour LSP setup may be initiated by an MP along with the setup of the protected LSP, which may be a major difference from procedures stated in IETF documents RFC 4090 and RFC 4875. Following the LSP setup procedure specified by the IETF document draft-lzj-mpls-receiver-driven-multicast-rsvp-te, the MP may send RSVP PATH message(s) towards the sender over a primary path. For link protection purpose, both the MP and PLR may be directly connected by the link being protected, hence the PATH message may be sent from the MP to the PLR directly upstream.

The MP may not necessarily be the originator of the primary LSP, but may be the first LSR entering an FRR domain along the primary route. Once the PATH message is sent out by the MP, the MP may check whether there is a detour route available for link protection. The detour route calculation can be done by running Constrained Shortest Path First (CSPF) on a link state database produced by Interior Gateway Protocol (IGP) protocols with Traffic Engineering (TE) extensions.

If the CSPF stack returns 'no detour route found' after the detour calculation, the MP may not perform the detour LSP setup. If at least one detour route is found by the CSPF stack, the MP may select the shortest route and initiate the detour LSP setup. The MP may consider the PLR as the end point of the detour LSP and may send a PATH message towards the PLR hop-by-hop. For example, in network 100 the PATH message may be sent by MP 133 to Pn 151 and then relayed to PLR 131.

Upon receipt of the PATH message, the PLR may send back a RESV message towards the MP through the Pn(s). The transit Pn(s) node may relay the PATH/RESV messages without any special process required for the link protection. The detour LSP setup may be completed once the RESV message is received and processed by the MP.

Because the detour method uses a dedicated backup LSP to protect a primary LSP, a one-to-one binding can be made for a pair of primary and backup LSPs and a single MPLS label encapsulation may be sufficient for packet forwarding and local failure repair purposes. Downstream Label Allocation (DLA) may be used as the label assignment method over the detour tunnel for the link protection. With mRSVP-TE, a downstream label may be assigned by an LSR that is sending a PATH message to its upstream router, and an upstream label may be assigned by an LSR that is sending the RESV message to its downstream router. The label allocation may be more complicated when the primary LSP is a P2MP or MP2MP tree. A specific upstream label allocation and resource pre-emption method is discussed herein to handle the protection of P2MP and MP2MP tree structures.

An example of the label allocation for link protection in the detour mode may be discussed in relation to network 100. Label primary (Lp) may be used to represent a label assigned to the primary tunnel, label backup (Lb) may be used to represent labels assigned to the backup tunnel, and x-y may be used to represent a link between x and y, where x and y are LSRs. For example, network 100 may employ the following downstream labels:

Lp1: assigned for receipt of data by PLR 131 from sender 110 via an upstream node.

Lp2: assigned for receipt of data by MP 133 from PLR 131 via active LSP 141.

Lb3: assigned for receipt of data by Pn 151 from PLR 131 via backup LSP 143.

Lb2: assigned for receipt of data by MP 133 from Pn 151 via backup LSP 143.

Label primary path to end point (Lp-Pe): assigned for transmission of data from MP 133 toward end point (PE), which may be downstream toward receiver 120.

In network 100, MP may receive label Lp-Pe from a downstream node in the direction of receiver 120. MP 133 may assign label Lp2 and send label Lp2 to PLR 131 via the PATH message over the link MP-PLR to set up the primary LSP (e.g. for LSP 141). For the detour route MP-Pn-PLR (e.g. LSP 143), MP 133 may assign label Lb2 and sends label Lb2 to Pn 151 via a PATH message. MP 133 may bind label Lp2 with label Lb2 for the pair of primary and detour LSPs. An entry 'Lp2→Lp-pe, PE' may be added into the MP's FIB to forward packets over the protected LSP. Another entry 'Lb2→Lp-pe, PE' may be added and used when traffic is received from the detour tunnel upon switchover.

Pn 151 on the detour tunnel may receive Lb2 from MP 133. Pn 151 may assign downstream label Lb3 and sends Lb3 to the PLR 131 via a PATH message. Pn 151 may add an entry 'Lb3→Lb2, MP' to its FIB for packet forwarding. Pn 151 may not be aware of the primary LSP (e.g. LSP 141), so there may only be one forwarding entry needed in Pn's 151 FIB for this LSP pair.

PLR 131 may receive two PATH messages from MP 133 and Pn 151, respectively. PLR 131 may bind label Lp2 from the primary LSP with label Lb3 from the detour LSP. The detour LSP 143 may end at PLR 131 while the primary LSP 141 may not end at PLR 131 if PLR 131 is not the root of the multicast tree (e.g. P2MP tree). PLR 131 may allocate a downstream label Lp1 and sends Lp1 to its upstream router, which may be outside of the FRR domain. PLR 131 may add two entries added into PLR's 131 FIB, 'L1→Lp2, MP' for the primary traffic forwarding, and 'Lp1→Lb3, Pn' for the detour traffic forwarding upon failover, respectively.

PLR 131 may process the PATH messages from MP 133 and may send RESV messages towards MP 133. If the primary sub-LSP is part of a Receiver Driven (RD) P2MP tree (e.g. a mRSvp-TE P2MP multicast tree), PLR 131 may not allocate upstream labels for receiving traffic from the downstream nodes MP 133 or Pn 151 because traffic may be uni-directionally forwarded in a P2MP tree. If the primary sub-LSP (e.g. LSP 141) is part of a RD MP2MP tree, PLR 131 may allocate an upstream label for receiving traffic from the opposite direction, and Pn 151 may do the same and allocate upstream label for the detour sub-LSP (e.g. LSP 151) accordingly. Detour LSP setup may be completed once MP 133 has received and processed the RESV messages originated by PLR 131.

Link failure can be detected by, for example, Bidirectional Forwarding Detection (BFD), along the protected LSP 141. The failure detection algorithm may be similar to the algorithms employed for sender-driven RSVP-TE. Once a link failure is detected by PLR 131 and all switchover criteria are met, PLR 131 may redirect the traffic to the detour LSP 143 based on the forwarding entry 'Lp1→Lb3, Pn'. The entry 'Lp1→Lp2, MP' for the primary path may be withdrawn.

The Pn may operate as a normal label switch router and may forward MPLS packets to MP 133. MP 133 may receive the packet, may determine that such packets come from the detour path (e.g. LSP 143), and may forward to the PE (e.g. toward receiver 120) based on the entry 'Lb2→Lp-pe, PE'. The detour traffic is therefore merged back to the primary LSP towards receiver 120, which may complete the link failure repairing by detouring and merging the traffic.

Routers that do not belong to the FRR domain may not be impacted by the link failure and local repair. Traffic may be transmitted over a detour LSP 143 after a link failure and local repair. The detour path may not be the shortest path, so the network 100 may eventually re-converge, which may result in a new shortest path being calculated by the MPLS control plane.

Once a new primary path is determined, the traffic may no longer be transmitted through the detour LSP 143 and PLR 131 may be notified to tear down the detour LSP 143 and clean up PLR's 131 internal FIB. PLR 131 may send a Path-Tear message to Pn 151 and MP 133 for tearing down the detour LSP 143 and may release backup labels. Re-convergence procedure may be similar to the procedure used for sender-driven RSVP-TE FRR.

Node protection may be a technique used to protect a node N that resides between a PLR and a MP over a primary LSP. N may denote a node being protected over a primary LSP, with an upstream node playing the role of a PLR and a downstream node playing the role of the MP. Pn may denote a transit node over a backup LSP. It should be noted that there may be multiple Pns over a backup tunnel. A Pn may not play a significant role for FRR but may operate as a regular LSR to receive and transmit multicast data and signaling messages over backup LSP(s).

Figure 2:
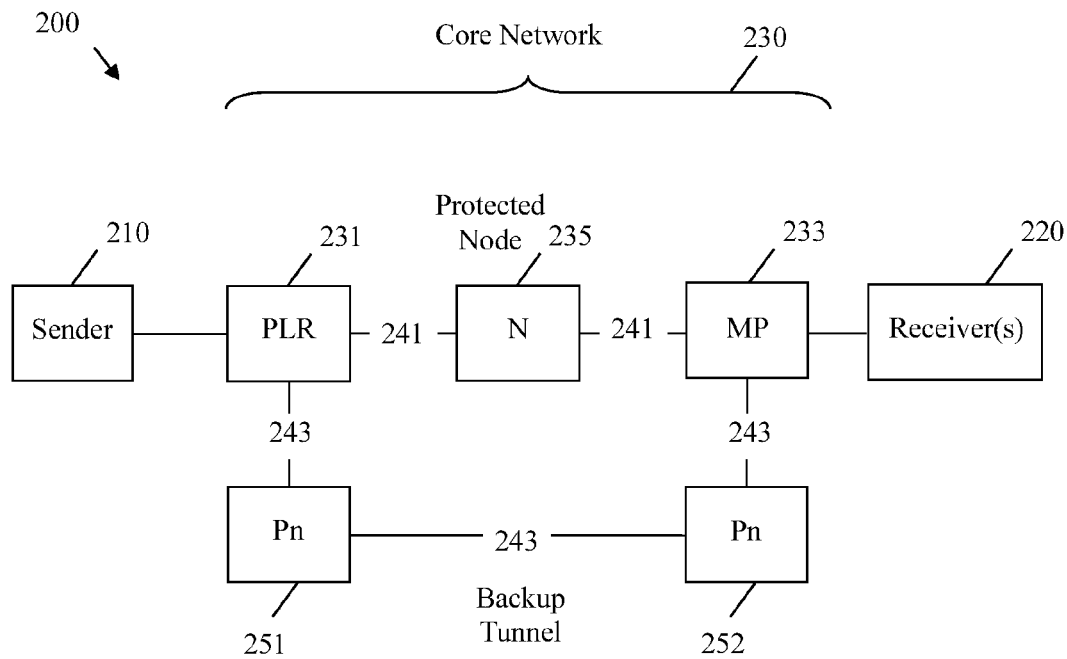
FIG. 2 is a schematic diagram of another embodiment of a multicast enabled network architecture for LSP node protection.
Figure 3:
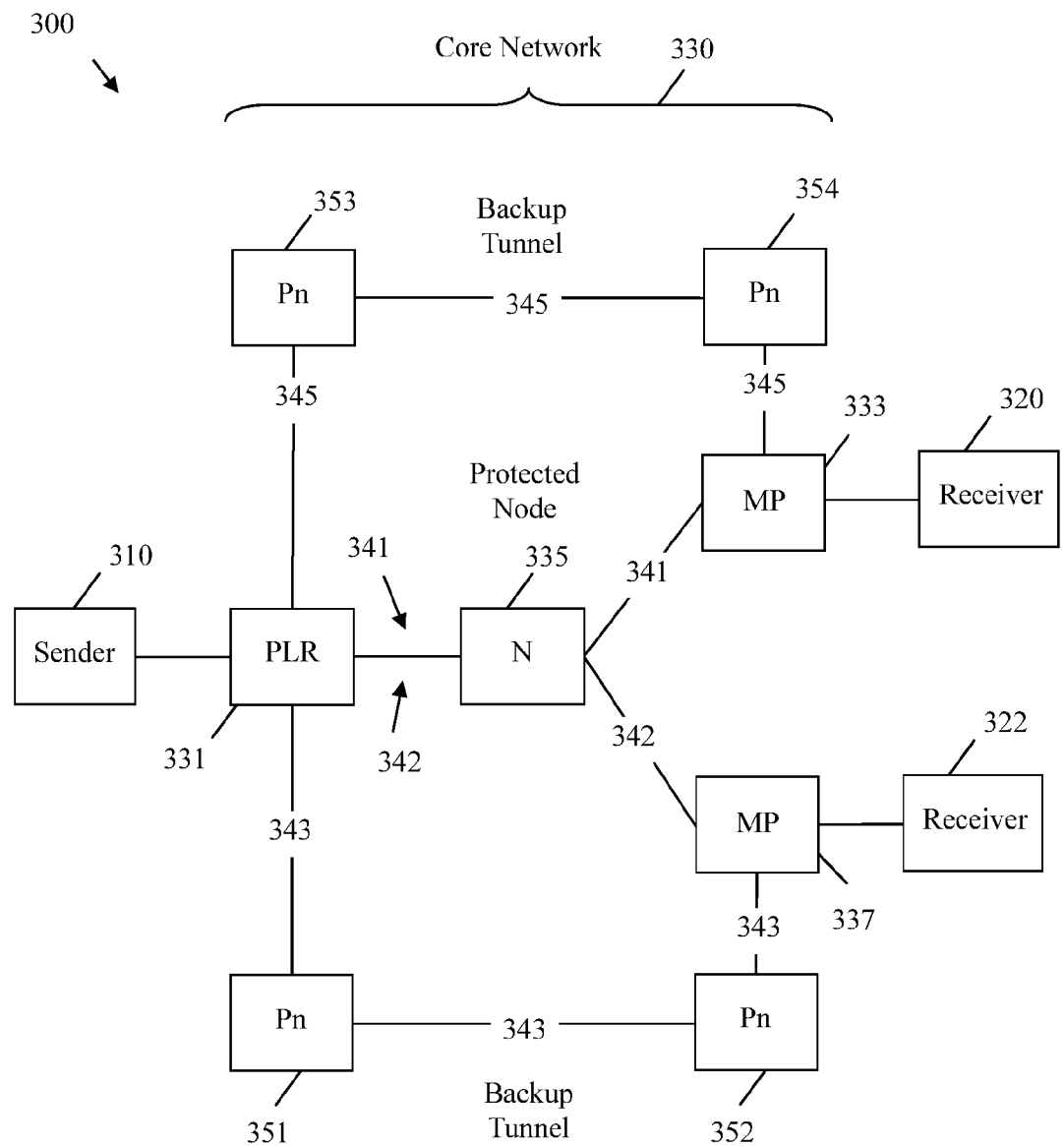
FIG. 3 is a schematic diagram of another embodiment of a multicast enabled network architecture for LSP protection in detour mode.

Besides P2P node protection, mRSVP-TE may be employed to provide P2MP and MP2MP node protection as shown in FIGS. 2 and 3. It should be noted that the same protection mechanism may be commonly used for both P2MP and MP2MP with differences as discussed herein. There may be two methods to protect a P2MP multicast tree, one that uses a P2MP tree as a backup LSP to protect a primary mLSP, and the other that uses multiple P2P LSPs to protect a P2MP mLSP (see FIG. 3). A router that detects a node/link failure may have pre-determined which alternate reroute path such router should use to forward traffic while the failure is being fixed. The alternate backup path may be established before a protected LSP is broken. Backup route computation and configuration required for local repair purposes may be completed prior to failure occurrence so that failover time may be reduced to minimum.

While the embodiments discussed herein employ DLA (e.g. allocation of labels by downstream components), it should be noted that labels may also be allocated by upstream components (e.g. Upstream Label Allocation (ULA)). For example, an MP (e.g. MP 133) may transmit a PATH message toward an upstream PLR (e.g. PLR 131). The PLR may allocate a downstream label and transmit such downstream label to the MP in a RESV message. The PLR may then transmit data to the MP by attaching the label allocated by the PLR to the data and forwarding the data downstream toward the MP.

FIG. 2 is a schematic diagram of another embodiment of a multicast enabled network 200 architecture for LSP node protection. Network 200 may comprise a sender 210, a core network 230, receivers 220, a PLR 231, an MP 233, and Pns 251-252, which may be substantially similar to sender 110, core network 130, receiver 120, PLR 131, MP 133, and Pn 151, respectively. Network 200 may further comprise N 235, which may be any network node, such as an LSR, along an active LSP to be protected by a backup LSP. Network 200 may further comprise active LSP 241, which may be substantially similar to active LSP 141, but may traverse N 235. MP 233 may setup a backup LSP 243 (e.g. traversing Pn 251 and Pn 252) in a substantially similar manner to backup LSP 143. In the event of a failure at N 235, PLR 231 may employ an FRR protocol to reroute multicast data from LSP 241 across backup LSP 243 to detour around failed node N 235 until N 235 may be repaired and/or until network reconvergence is complete.

As shown in network 200, detour LSP setup for node protection may be similar to link protection shown in network 100. In network 200, protected node N 235 may reside between MP 233 and PLR 231. In this case the two sub-links MP-N and N-PLR may also to be protected in addition to the node N 235 protection. It should be noted that the link protection mechanism described in relation to network 100 may also be applicable to the sub-link protection in network 200 situation. A combined solution for providing node protection with link protection can be derived from the solutions of networks 100 and 200.

For the node protection shown in FIG. 2, MP 233 may send a PATH message to N 235 for the primary LSP setup (e.g. LSP 241). The primary LSP 241 in the FRR domain may go through the route MP-N-PLR. Once the PATH message is sent out to N 235, MP 233 may determine whether there is a detour path available to protect node N 235 (e.g. by using a CSPF computation by indicating N 235 as a node to be avoided on the detour path). If no detour route is found, MP 233 may skip the detour LSP setup. If a detour route is found, MP 233 initiates the detour LSP setup and considers PLR 231 as the end-point of the detour LSP. MP 233 may send a PATH message towards PLR 231 over the detour route hop-by-hop. The detour route (e.g. LSP 243 is in the order of MP-Pn252-Pn251-PLR. Similar to the link protection of network 100, PLR 231 may send back a RESV message towards MP 233 through Pn 251-252. Transit nodes Pn 251-252 may relay the PATH and RESV messages without any specific node protection procedure. The detour LSP 243 setup may be completed once the RESV message is received and processed by MP 233.

Similar to link protection, node protection may employ a single label encapsulation and downstream label allocation method in the detour backup mode. For example, network 200 may employ the following downstream labels:

Lp1: assigned for receipt of data by PLR 231 from sender 210 via an upstream node.

Lp2: assigned for receipt of data by N 235 from PLR 231 via active LSP 241.

Lp3: assigned for receipt of data by MP 133 from N 235 via active LSP 241.

Lb4: assigned for receipt of data by Pn 251 from PLR 231 via backup LSP 243.

Lb5: assigned for receipt of data by Pn 252 from Pn 251 via backup LSP 243.

Lb3: assigned for receipt of data by MP 233 from Pn 252 via backup LSP 243.

Lp-Pe: assigned for transmission of data from MP 233 toward PE, which may be downstream toward receiver 220.

MP 233 may assign label Lp3 for the primary LSP 241 and sends Lp3 to node N 235 via a PATH message over the protected route {MP-N-PLR}. N 235 may allocate a downstream label Lp2 and sends Lp2 to PLR 231 via a PATH message. MP 233 may also assign a label Lb3 for the detour LSP 243 and sends Lb3 to Pn 252 via a PATH message over the detour route MP-Pn252-Pn251-PLR. MP 233 may bind label Lp3 with label Lb3 for this pair of primary and backup LSPs (e.g. LSPs 241 and 243). An entry 'Lp3→Lp-pe, PE' may be added to MP's 233 FIB for packet forwarding over the primary LSP 241. Another entry 'Lb3→Lp-pe, PE' may be kept in the FIB and employed when a failover takes place and traffic is redirected to the detour LSP 243.

There may be multiple transit nodes Pn(s) 251-252 along the detour LSP 243, each of which will allocate a downstream label and sends such downstream label to its upstream router. Eventually PLR 231 may receive the PATH message from the protected node N 235 and the transit node Pn 251 in this example. PLR 231 may bind primary label Lp2 with detour label Lb4, and add the following two entries into its FIB: 'L1→Lp3, N' for traffic forwarding over the primary LSP 241, and 'L1→Lb4, Pn1' for the traffic forwarding over the detour LSP 243.

When a failure at N 235 is detected by PLR 231, PLR 231 may redirect traffic from the primary LSP 241 to detour LSP 243 based on the binding and forwarding entry 'L1→Lb4, Pn1'. The traffic may be forwarded through LSR-Pn251-Pn253-MP. MP 233 may receive packets from the detour path 243. Consulting MP's 233 FIB forwarding entry 'Lb3→Lp-Pe, PE', traffic may be forwarded toward receiver 220 so that the detoured traffic may be merged into the primary path.

The local repair mechanism for the node protection may be substantially the same as the link protection (e.g. in network 100) in the detour mode except that there are two links {MP-N} and {N-PLR} to be protected in conjunction with the protection of node N 235. The FRR domain may be configured so that both the link and node failure detection methods are specified. For example, BFD may be activated between MP 233 and N 235, N 235 and PLR 231, and PLR 231 and MP 233. PLR 231 and MP 233 can be used for link repair, node repair, or both depending on the results of BFD detection.

After a node failure takes place, the network topology may change. As a consequence, the network 200 may eventually re-converge and a new best path may be computed to establish a new primary LSP. PLR 231 may be notified as soon as the new primary LSP is signaled and set up. PLR 231 may send notification messages to Pn 251 and MP 233 for tearing down the detour LSP 243 and may withdraw backup labels.

FIG. 3 is a schematic diagram of another embodiment of a multicast enabled network 300 architecture for LSP protection in detour mode. A network 300 operating in detour mode may require that each LSP be protected by a substantially unique backup LSP, which may result in one-to-one (1:1) LSP protection. Network 300 may comprise a sender 310, a core network 330, receivers 320 and 322, a PLR 331, MPs 333 and 337, a N 335, and Pns 351-354, which may be substantially similar to sender 210, core network 230, receivers 220, PLR 231, MP 233, N 235, and Pns 251 and 252, respectively. Network 300 may further comprise active LSP 341 and active LSP 342, which may each be substantially similar to active LSP 241. Active LSP 341 and 342 may be configured to transmit the same multicast data, in which case N 335 may act as a branch of a multicast tree and may replicate packets received on an upstream interface for transmission on a plurality of downstream interfaces across LSPs 341-342. In another embodiment, active LSPs 341 and 342 may comprise different multicast data. In either case, a network operating in detour mode may require that each LSP be protected by a different backup LSP. MP 333 may request the creation of backup LSP 345 via Pn 353 and Pn 354 to protect active LSP 341. MP 337 may request the creation of backup LSP 343 via Pn 351 and Pn 352 to protect active LSP 342.

In the event of a failure of N 335, PLR 331 may employ a FRR protocol to reroute multicast data from LSP 341 across backup LSP 345 and reroute multicast data from LSP 342 across backup LSP 343, respectively, to detour around failed node N 335. In the event of a failure of a link between N 335 and MP 333, PLR 231 may reroute traffic over LSP 341, but not reroute traffic over active LSP 342. In the event of a failure of a link between N 335 and MP 337, PLR 231 may reroute traffic over active LSP 342, but not reroute traffic over active LSP 341. Such reroutings may persist until the failure is resolved and/or until network reconvergence.

Figure 4:
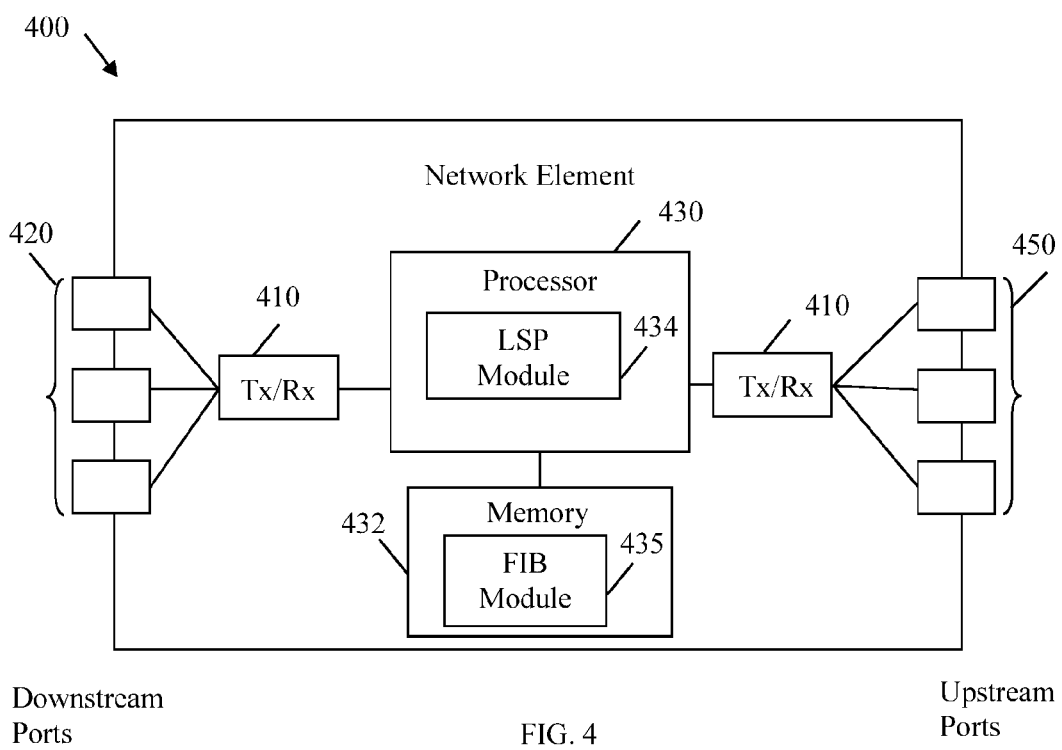
FIG. 4 is a schematic diagram of an embodiment of a NE which may act as a node within a multicast enabled network.

FIG. 4 is a schematic diagram of an embodiment of a NE 400 which may act as a node within a multicast enabled network such as network 100, 200, and/or 300, and may be configured to request and/or reserve LSPs, act as an LSR, and/or perform FRR operations such as PLR 131, 231, and/or 331, MP 133, 233, 333, and/or 337, Pn 151, 251, 252, and/or 351-354, and/or N 235 and/or 335. NE 400 may be implemented in a single node or the functionality of NE 400 may be implemented in a plurality of nodes in a core network such as core network 130, 230, and/or 330. In some embodiments NE 400 may also act as other node(s) in network 100, 200 and/or 300. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments. At least some of the features/methods described in the disclosure may be implemented in in a network apparatus or component such as an NE 400. For instance, the features/methods in the disclosure may be implemented using hardware, firmware, and/or software installed to run on hardware. The NE 400 may be any device that transports frames through a network, e.g., a switch, router, bridge, server, a client, etc. As shown in FIG. 4, the NE 400 may comprise transceivers (Tx/Rx) 410, which may be transmitters, receivers, or combinations thereof. A Tx/Rx 410 may be coupled to plurality of downstream ports 420 (e.g. downstream interfaces) for transmitting and/or receiving frames from other nodes and a Tx/Rx 410 coupled to a plurality of upstream ports 450 (e.g. upstream interfaces) for transmitting and/or receiving frames from other nodes, respectively. A processor 430 may be coupled to the Tx/Rxs 410 to process the frames and/or determine which nodes to send frames to. The processor 430 may comprise one or more multi-core processors and/or memory devices 432, which may function as data stores, buffers, etc. Processor 430 may be implemented as a general processor or may be part of one or more application specific integrated circuits (ASICs) and/or digital signal processors (DSPs). Processor 430 may comprise an LSP module 434, which may process PATH requests, process RESV messages, allocate labels, bind labels and/or LSPs, perform label switching, and/or perform any methods disclosed herein. For example, LSP module 434 may perform methods 500 and/or 600 as discussed more fully hereinbelow. Memory devices 432 may comprise an FIB module 435, which may store, update, and/or retrieve labels and/or bindings upon request of the LSP module 434. In an alternative embodiment, the LSP module 434 may be implemented as instructions stored in memory 432, which may be executed by processor 430. In another alternative embodiment FIB module 435 may be implemented in a cache on the processor 430. In another alternative embodiment, the LSP module 434 and the FIB module 435 may be implemented on separate NEs. The downstream ports 420 and/or upstream ports 450 may contain electrical and/or optical transmitting and/or receiving components. NE 400 may or may not be a routing component that makes routing decisions.

It is understood that by programming and/or loading executable instructions onto the NE 400, at least one of the processor 430, LSP module 434, downstream ports 420, Tx/Rxs 410, memory 432, FIB module 435, and/or upstream ports 450 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 5:
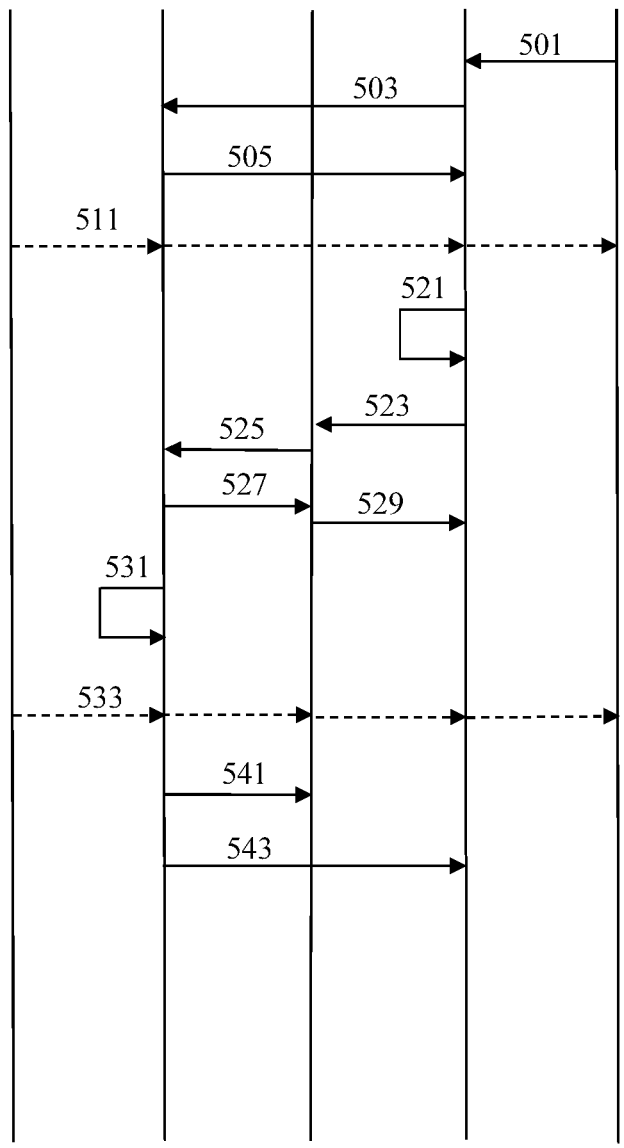
FIG. 5 is a protocol diagram of an embodiment of a method of LSP link protection.

FIG. 5 is a protocol diagram of an embodiment of a method 500 of LSP link protection. Method 500 may be implemented on a network such as networks 100, 200, and/or 300. At step 501, a receiver (e.g. receivers 120, 220, 320, and/or 322) may transmit a multicast join request message to an MP (e.g. MP 133, 233, 333, and/or 337). The join request may be a PIM join message, an MLD membership report, an IGMP membership report, or other request to join a multicast tree. The MP may receive the join request on a downstream interface. In response to the join request, the MP may request to join the multicast transmit on behalf of the using MPLS signaling. At step 503, the MP may calculate the shortest and/or most optimal path (e.g. primary path) across the MPLS domain toward the root of the multicast tree (e.g. the sender and/or the PLR) and transmit a first PATH message toward the sender on the MPs upstream interface along the primary path. The first PATH message may request the creation of an active multicast LSP along the primary path. The MP may also assign a downstream label to the requested active LSP and may encode the downstream label in the first PATH message. The first PATH message may be received by a PLR (e.g. PLR 131, 231, and/or 331) on a downstream interface. At step 505, the PLR may store the downstream label for the active LSP in an FIB and transmit a first RESV message downstream toward the MP across the primary path to confirm creation of an active LSP. The PLR may also assign an upstream label to the active LSP to allow for bidirectional communication over the active LSP. The PLR may store the optional upstream label in the first RESV message of step 505. PLR may already be a member of the requested multicast tree. If PLR is not a member of the multicast tree, PLR may assign a downstream label and transmit the label in a PATH message toward the sender (e.g. to another upstream node in the MPLS domain) in a manner substantially similar to steps 503 and 505. At step 511, the sender (e.g. sender 110, 210, and/or 310) may transmit (e.g. stream) multicast data toward PLR. PLR may retrieve the downstream label from the FIB, attach the downstream label to the multicast data, and forward the data to MP. MP may remove the downstream label and forward the multicast data to receiver using a protocol consistent with the protocol of step 501. The stream of step 511 may continue unless a failure occurs along the active LSP, the receiver no longer wishes to receive the data, the sender determines to stop transmission, the network is re-optimized, etc.

At step 521, the MP may determine whether an alternate path exists that may be employed to protect the active LSP (e.g. a detour route). The MP may determine that a route through a Pn (e.g. Pn 151, 251, 252, and/or 351-354) may protect a link of the active LSP (e.g. a link between MP and PLR) against failure by traversing the network between MP and PLR without traversing the protected link. If a plurality of alternate paths exists, MP may select the shortest and/or most optimal detour route. At step 523, the MP may transmit a second PATH request along the selected detour path to request the creation of a backup LSP. MP may also assign a downstream label to the backup LSP, bind the downstream label and/or information identifying the backup LSP to data for the active LSP in the FIB, and/or encode the backup LSP downstream label in the second PATH request. Pn may receive the backup LSP PATH request of step 523 on a downstream interface, assign another downstream label to the backup LSP, and record an association between Pn's backup LSP downstream label and MP's backup path downstream label in a local FIB. At step 525, Pn may transmit a PATH message comprising Pns downstream label upstream toward the sender via PLR. PLR may receive the PATH message of step 525 and bind Pns backup LSP downstream label and/or backup LSP data to data for the protected active LSP in the PLR's FIB. At step 527, PLR may transmit a RESV message along the detour route toward MP via Pn to complete the setup of the backup LSP. At step 529, Pn may forward the RESV message to MP. If upstream communication is allowed, PLR and Pn may assign upstream labels and forward such upstream labels in the RESV messages at steps 527 and 529 for storage in the FIBs of Pn and MP, respectively.

At some point subsequent to step 529, a failure may occur at the protected link of the active LSP (e.g. at link between PLR and MP). At step 531, PLR may detect the link failure and initiate an FRR protocol to reroute data streaming across the active LSP (e.g. from step 511). At step 533, PLR may retrieve the downstream label for Pn associated with the backup LSP from the FIB, attach Pn's downstream label to the multicast data received from the sender, and forward the data to Pn. Pn may use Pn's downstream label to find MP's downstream label in the FIB, swap Pn's downstream label with MP's downstream label, and forward the multicast data to MP. MP may receive the multicast data comprising the downstream label assigned to the backup path, determine that a link failure has occurred, merge multicast data from the backup LSP with any remaining multicast data from the active LSP, and continue forwarding such streaming data toward the receiver. The PLR, Pn, and/or MP may be aware of the link failure due to the change in label usage, while the receiver may not be aware of the link failure. PLR, Pn, and/or MP may signal the link failure across the MPLS domain, which may result in a link repair and/or a network reconvergence. Upon completion of link repair and/or a network reconvergence, at steps 541 and 543, the PLR may transmit messages directing Pn and MP to tear down the backup LSP in favor of more optimal active and/or backup LSPs.

Figure 6:
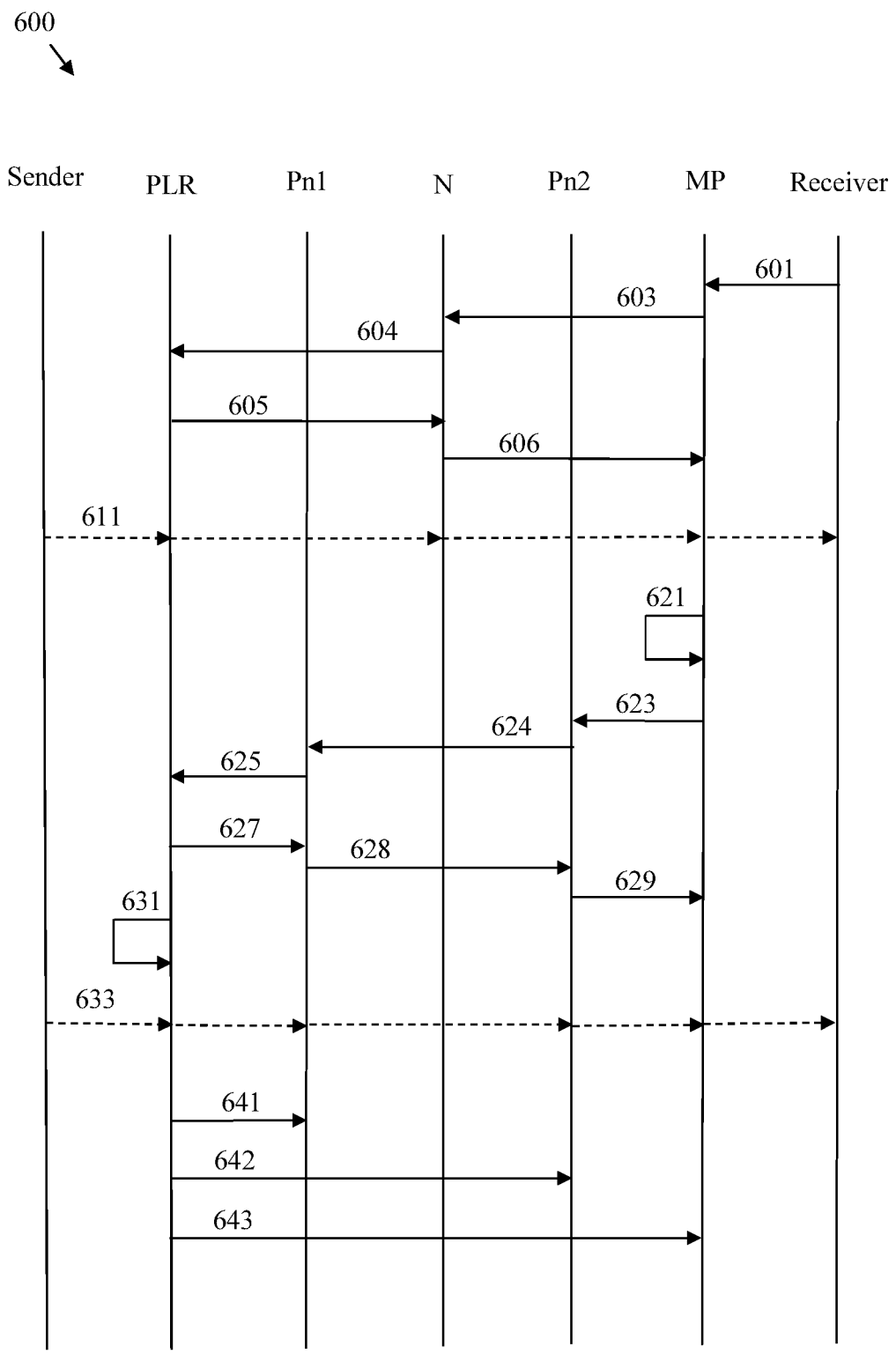
FIG. 6 is a protocol diagram of an embodiment of a method of LSP node protection.

FIG. 6 is a protocol diagram of an embodiment of a method 600 of LSP node protection. Method 600 may be similar to method 500 but may protect a node N (e.g. 235 and/or 335) of networks 200 and/or 300. Step 601 may be substantially similar to step 501. At steps 603-604, MP may transmit a PATH message for an active LSP toward PLR via protected node N in a manner similar to step 503. At steps 605-606, PLR may forward a RESV message toward PLR in a manner similar to step 505. Label allocation for the active LSP of steps 603-606 may also be similar to label allocation of backup LSP of steps 523, 525, 527, and 529. At step 611, sender may stream multicast data toward the receiver via the LSP across PLR, N, and MP using label switching as discussed above.

At step 621, MP may determine to protect N and may determine whether a potential backup LSP exists that ends at PLR and does not traverse N in a manner similar to step 521. MP may determine that a backup route exists that traverses Pn1 and Pn2. At steps 623, 624, and 625, MP may send a PATH message toward PLR (e.g. along a path traversing Pn1 and Pn2) requesting a backup LSP. The PATH message may be used to transmit downstream allocated labels, which may be stored in FIBs at the upstream nodes in a manner similar to method 500. At step 627, 628, and 629, the PLR may respond to the backup PATH request with a RESV message transmitted along the backup route. As with method 500, the RESV may be employed to transmit upstream allocated labels for upstream communication across the backup LSP.

At step 631, PLR may discover a failure at node N in a manner similar to step 531. At step 633, PLR may initiate an FRR protocol to reroute the multicast data stream of step 611 around failed node N by employing the reserved backup LSP in a manner similar to step 533. PLR may attach a downstream label from Pn1 to the multicast data and forward the data to Pn1. Pn1 may exchange Pn1's downstream label for a downstream label from Pn2 and forward the data to Pn2. Pn2 may exchange Pn2's downstream label with a downstream label from MP and forward the data to MP. MP may merge the traffic from the backup LSP with any remaining traffic from the active LSP and forward the data on to the receiver. At steps 641, 642, and 643 PLR may tear down the backup LSP by sending messages to Pn1, Pn2, and MP, respectively, after repair of reconvergence in a manner similar to steps 541 and 543.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Re, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

We claim:

1. A method of detour protection by a merge point (MP) comprising:
   sending a first multicast Resource Reservation Protocol-Traffic Engineering (mRSVP-TE) path request (PATH) message toward a multicast sender over a primary Label Switch Path (LSP);
   checking whether a detour route is available for primary LSP protection; and
   selecting a shortest detour route on a hop-by-hop basis and initiate a detour LSP setup when at least one detour route is found, wherein detour LSP setup comprises assigning a Point of Local Repair (PLR) as an end point of a detour LSP by:
   sending a second PATH message toward the PLR along the shortest detour route; and
   receiving a mRSVP-TE reserve (RESV) message from the PLR.

2. The method of claim 1, wherein the detour LSP setup further comprises:
   assigning a downstream label to the detour LSP; and
   sending the assigned label via the second PATH message.

3. The method of claim 1, wherein the RESV message comprises an upstream label assigned to the detour LSP by a node positioned on the shortest detour route.

4. The method of claim 1, further comprising receiving traffic from the PLR along the detour LSP upon failure along the primary LSP.

5. The method of claim 1, further comprising storing a one-to-one binding of the primary LSP and the detour LSP in a Forwarding Information Base (FIB).

6. The method of claim 1, wherein upstream labels for traffic from the MP are not allocated by the PLR when the primary LSP is part of a Receiver Driven (RD) Point to Multipoint (P2MP) tree.

7. The method of claim 1, further comprising:
   receiving detour traffic from the detour LSP upon failure of the primary LSP;
   merging the detour traffic with primary traffic from the primary LSP; and
   forwarding the merged traffic downstream.

8. An apparatus comprising:
   at least one receiver;
   at least one transmitter configured to send a first multicast Resource Reservation Protocol-Traffic Engineering (mRSVP-TE) path request (PATH) message toward a multicast sender over a primary Label Switch Path (LSP); and
   a non-transitory memory comprising instructions;
   a processor coupled to the memory that reads and executes the instructions to:
   cause the apparatus to act as a merge point (MP) for merging traffic between a detour LSP and a primary LSP;
   check whether a detour route is available for protection of the primary LSP; and
   select a shortest detour route on a hop-by-hop basis and initiate setup of the detour LSP when at least one detour route is found, wherein detour LSP setup comprises assigning a Point of Local Repair (PLR) as an end point of a detour LSP by:
   sending, via the transmitter, a second PATH message toward the PLR along the shortest detour route; and
   receiving, via the receiver, a mRSVP-TE reserve (RESV) message from the PLR.

9. The apparatus of claim 8, wherein the detour LSP setup further comprises:
   assigning a downstream label to the detour LSP; and
   sending the assigned label via the second PATH message.

10. The apparatus of claim 8, wherein the RESV message comprises an upstream label assigned to the detour LSP by a node positioned on the shortest detour route.

11. The apparatus of claim 8, wherein the receiver is further configured to receive traffic from the PLR along the detour LSP upon failure along the primary LSP.

12. The apparatus of claim 8, further comprising a memory coupled to the processor, the memory configured to store a one-to-one binding of the primary LSP and the detour LSP in a Forwarding Information Base (FIB).

13. The apparatus of claim 8, wherein upstream labels for traffic from the MP are not allocated by the PLR when the primary LSP is part of a Receiver Driven (RD) Point to Multipoint (P2MP) tree.

14. The apparatus of claim 8, wherein the receiver is further configured to receive detour traffic from the detour LSP upon failure of the primary LSP, wherein the processor is further configured to merge the detour traffic with primary traffic from the primary LSP, and wherein the transmitter is further configured to forward the merged traffic downstream.

15. A non-transitory computer readable medium comprising a computer program product comprising executable instructions, wherein the instructions when executed by a processor cause a network element (NE) to:
   send a first multicast Resource Reservation Protocol-Traffic Engineering (mRSVP-TE) path request (PATH) message toward a multicast sender over a primary Label Switch Path (LSP);
   check whether a detour route is available for protection of the primary LSP; and
   select a shortest detour route on a hop-by-hop basis and initiate a detour LSP setup when at least one detour route is found, wherein detour LSP setup comprises assigning a Point of Local Repair (PLR) as an end point of a detour LSP by:
      sending a second PATH message toward the PLR along the shortest detour route; and
      receiving a mRSVP-TE reserve (RESV) message from the PLR.

16. The computer program product of claim 15, wherein the detour LSP setup further comprises:
   assigning a downstream label to the detour LSP; and
   sending the assigned label via the second PATH message.

17. The computer program product of claim 15, wherein the RESV message comprises an upstream label assigned to the detour LSP by a node positioned on the shortest detour route.

18. The computer program product of claim 17, wherein the instructions further cause the NE to receive traffic from the PLR along the detour LSP upon failure along the primary LSP.

19. The computer program product of claim 15, wherein the instructions further cause the NE to store a one-to-one binding of the primary LSP and the detour LSP in a Forwarding Information Base (FIB).

20. The computer program product of claim 15, wherein upstream labels for traffic from the MP are not allocated by the PLR when the primary LSP is part of a Receiver Driven (RD) Point to Multipoint (P2MP) tree.

* * * * *